Figure 1:
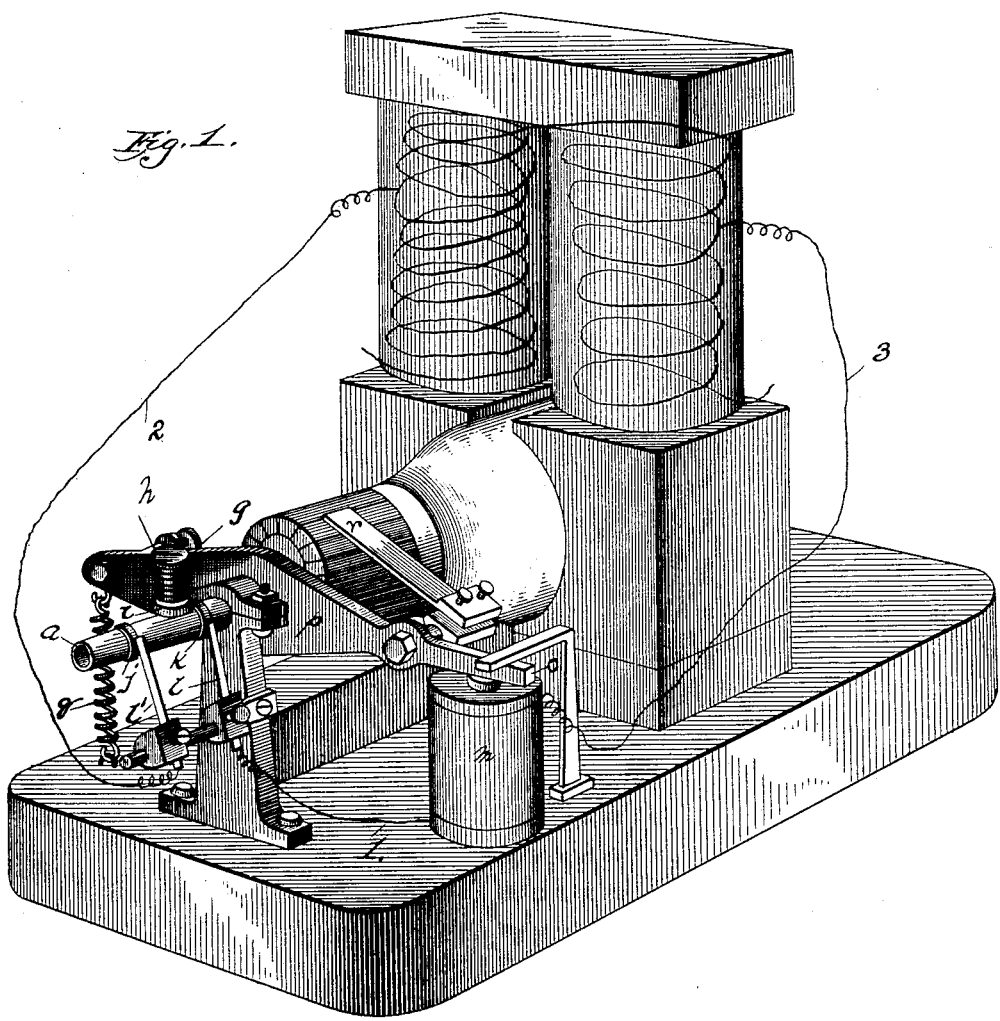

(No Model.) 2 Sheets—Sheet 1.

J. F. KESTER.
REGULATOR FOR DYNAMO ELECTRIC MACHINES.

No. 399,147. Patented Mar. 5, 1889.

WITNESSES
Edwin L. Yewell,
H. E. Peck.

INVENTOR
per J. F. Kester
C. E. Duffy,
Attorney (No Model.) 2 Sheets—Sheet 2.
J. F. KESTER.
REGULATOR FOR DYNAMO ELECTRIC MACHINES.
No. 399,147. Patented Mar. 5, 1889.
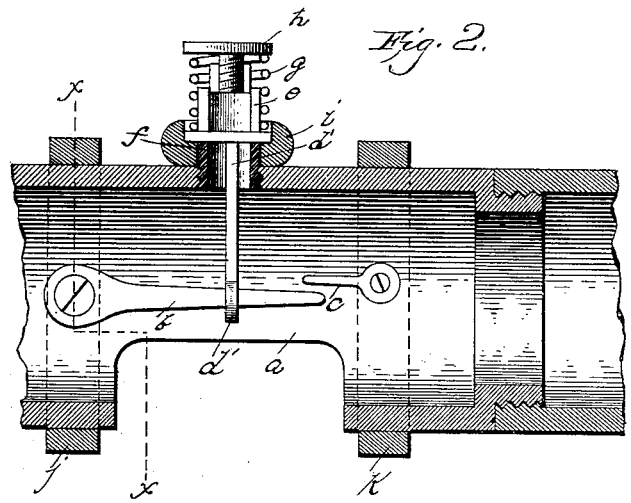
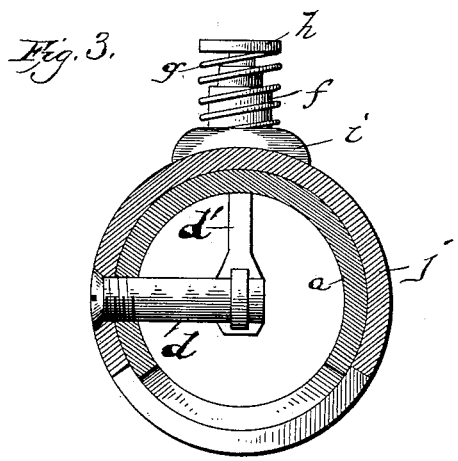
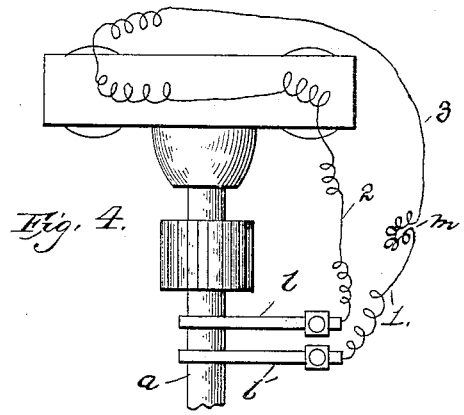
WITNESSES
Edwin L. Yewell,
H. E. Peck,
INVENTOR
J. F. Kester,
per O. E. Duffy

UNITED STATES PATENT OFFICE.

JESSE F. KESTER, OF TERRE HAUTE, INDIANA, ASSIGNOR OF THREE-FOURTHS TO JOSEPH H. BRIGGS, OF SAME PLACE.

REGULATOR FOR DYNAMO-ELECTRIC MACHINES.

SPECIFICATION forming part of Letters Patent No. 399,147, dated March 5, 1889.

Application filed October 29, 1888. Serial No. 289,412. (No model.)

*To all whom it may concern:*

Be it known that I, JESSE F. KESTER, of Terre Haute, in the county of Vigo and State of Indiana, have invented certain new and useful Improvements in Regulators for Dynamo-Electric Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in regulators for dynamo-electric machines or motors.

The object of the invention is to provide a regulator which shall be quick and efficient in operation, simple and durable in construction, and exceedingly sensitive and reliable in action; and with these ends in view my invention consists in certain novel features of constructions and combinations of parts, more fully described hereinafter, and particularly pointed out in the claims.

Referring to the accompanying drawings, Figure 1 is a perspective view of a machine provided with the improved regulator. Fig. 2 is a detail sectional view of an armature-shaft extension, showing the centrifugal governor and circuit-controller. Fig. 3 is a section of Fig. 2 on line $x\,x$. Fig. 4 is a plan view of a machine provided with the regulator, showing the connections with the field-magnet.

I will first briefly describe the governor shown, and will then set forth the circuit controlled by the same to effect the regulation of the machine.

$a$ is a tube of insulating material forming an extension of the armature-shaft. Metallic rings $j$ and $k$ are sleeved on this extension. In electric connection with these rings are circuit-closing arms $b\,c$, suitably supported on arms, as $d$, extending from the respective rings to the center of the shaft. One of the circuit-closing arms, $b$, is pivoted so as to be swung into contact with the other fixed arm, $c$. A rod, $d'$, spans the movable circuit-closer, and is provided with T-shaped flanges or projections at its upper end confined and adapted to slide in slots $e$ of a hollow support, $f$, secured to and extending radially from extension $a$. The projections of rod $d'$ project through said slots, and are pressed down by a coiled spring, $g$, on support $f$, the other end of the spring bearing against a thumb-screw, $h$. A governor-weight, $i$, is arranged to slide over the support $f$, and is provided with recesses to accommodate the projections of rod $d'$, as clearly illustrated in Fig. 2. It will now be evident that when the shaft to which the extension is secured is rotated at a high rate of speed the weight $i$ will be acted upon by centrifugal force and will compress the spring against the thumb-screw, lifting rod $d'$ and bringing the two circuit-closing cams $b\,c$ into contact. It will also be evident that by adjusting the thumb-screw to or from the shaft the spring will be put upon more or less tension, and therefore a higher or lower speed will be required to bring the arms $b$ and $c$ into contact.

In contact with the rings $j$ and $k$ are two brushes or conducting-strips, $l\,l'$, (see Fig. 1,) supported upon a suitable part of the frame, and these strips or brushes are connected electrically with an electro-magnet, $m$, and with a part of the field-magnet coils by connections 1, 2, and 3, as shown by diagram in Fig. 4. In operative relation to the core of the electro-magnet is an extension, $o$, of the movable brush-holder $p$, and the opposite end of this brush-holder is held in its normal position by a retractile spring, $q$, suitable stops, as shown, being provided to keep the play of the holder within certain limits. It will now be evident that when a certain speed is reached a current will be closed at $b\,c$, said current including the electro-magnet and part of the field-magnet coils, the electro-magnet will be energized, and the extension of the brush-holder will be drawn down to the same, and hence the position of the commutator-brushes $r$ upon the commutator changed, whereby the line of commutation of the current will be shifted and the current strength correspondingly varied, and the speed of the machine or amount of current proportionally reduced.

The term "commutator-brushes" is used for convenience to cover all devices capable of collecting the current from a commutator.

The peculiar speed-governor and circuit-controller shown and described are not claimed in the present application, but form a portion of and are claimed in an application filed by me March 15, 1888, Serial No. 267,278; and, further, I wish it understood that the present invention is not limited to use in connection with the peculiar governor and circuit-controller shown, and that various slight changes and modifications might be made in the form and arrangement of the parts described without departing from the spirit and scope of my invention; hence I do not wish to limit myself strictly to the precise construction herein set forth, but consider myself entitled to all such changes.

What I claim is—

1. A dynamo-regulator comprising adjustable commutator-brushes, an electro-magnetic device to shift the same, a normally-open regulating-circuit including the electro-magnetic device, a circuit-controller, and a speed-governor carried by a rotating part of the machine and connected with the circuit-controller, as set forth.

2. In a regulator for an electric motor or generator, the combination of a movable brush-holder for the commutator-brushes, an electro-magnet to shift the brush-holder and change the line of commutation, a regulating-circuit including the electro-magnet, a circuit-controller in the circuit, and a speed-governor attached to a rotating part of the machine for operating the circuit-controller when the machine reaches a certain speed, as described.

3. In a regulator for an electric motor or generator, the combination of a movable brush-holder, an electro-magnet to shift said brush-holder, a regulating-circuit including the magnet and part of the field-magnet coil, a circuit-controller in the circuit, and a centrifugal governor attached to a rotating part of the machine for operating the circuit-controller when the machine reaches a certain speed, substantially as described.

4. A dynamo-regulator comprising adjustable commutator-brushes, an electro-magnetic device to adjust the same, a regulating-circuit including a source of electricity and the electro-magnetic device, and a speed-governor carried by a rotating part of the machine to close the regulating-circuit when a predetermined speed is reached and actuate the electro-magnetic device to adjust the commutator-brushes.

5. A dynamo-regulator comprising shifting commutator-brushes, an electro-magnetic device to adjust the same, a normally-open regulating-circuit including a source of current and the electro-magnetic device, and a centrifugal circuit-controller to close the circuit and actuate the electro-magnetic device to adjust the brushes.

6. A dynamo current regulator comprising shifting commutator-brushes, an electro-magnetic device to adjust the same, a regulating-circuit including a portion of the field-magnet and the electro-magnetic device, a circuit-controller in the circuit, and a speed-regulator carried by the armature-shaft and connected with the controller to close the circuit and thereby shift the commutators when a predetermined speed is attained.

7. A dynamo-regulator comprising a movable brush-holder provided with stops to limit its movements, a spring secured to one end of the same to yieldingly hold that end depressed, an extension upon the opposite end of the holder, an electro-magnet located below the extension which forms the armature of the magnet, a normally-open regulating-circuit including the magnet, and a centrifugal circuit-controller to close the circuit and actuate the magnet to move the brush-holder.

8. In a regulator, the combination of an armature-shaft extension, a circuit-closer carried by the same, a centrifugal governor to operate the circuit-closer, collars on the extension connected with the closer, brushes bearing upon the collars, and a regulating-circuit including the closer, collars, and brushes, substantially as described.

In testimony that I claim the foregoing as my own I affix my signature in presence of two witnesses.

JESSE F. KESTER.

Witnesses:
O. E. DUFFY,
HUBERT E. PECK.